UNITED STATES PATENT OFFICE.

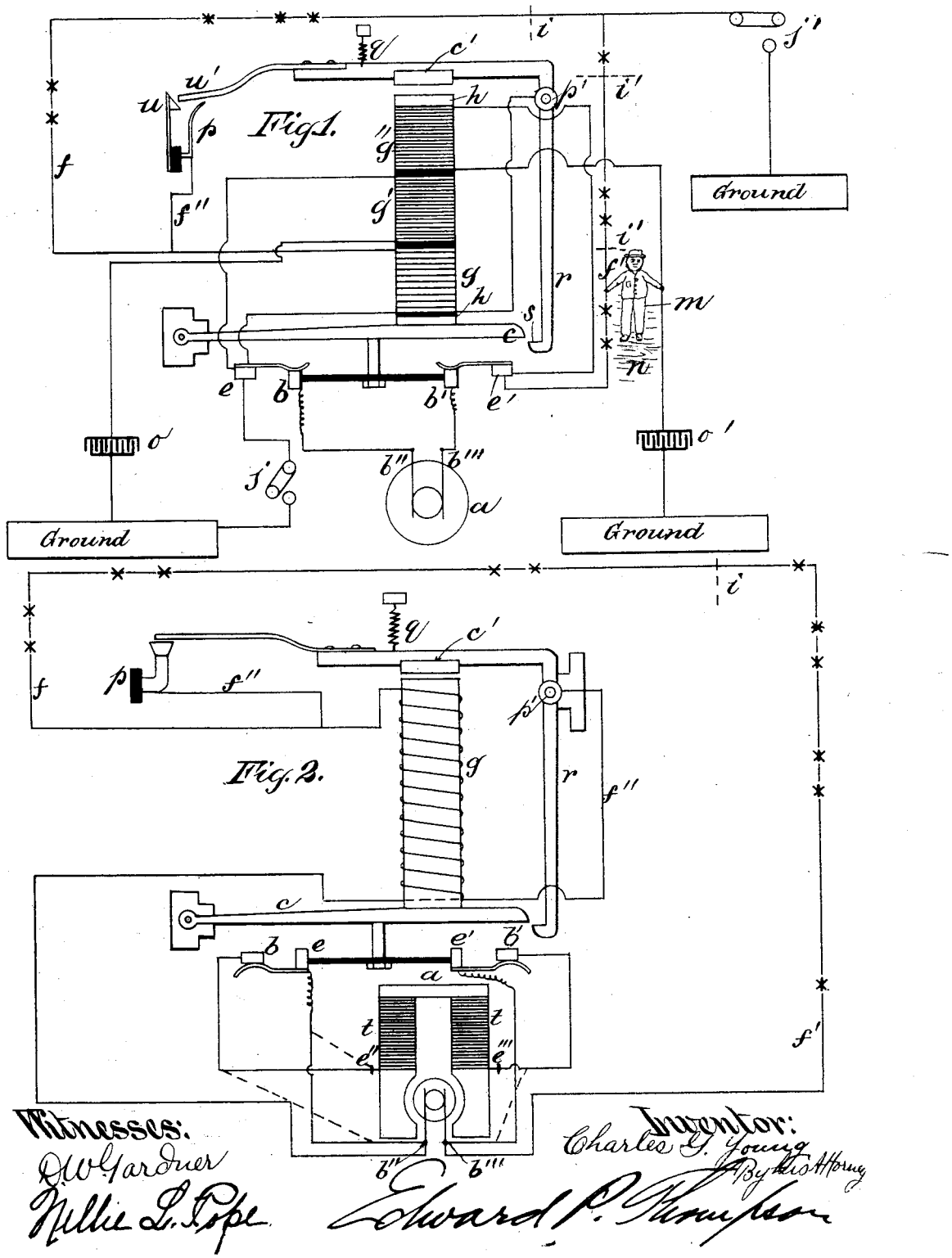

CHARLES G. YOUNG, OF NEW YORK, N. Y.

SAFETY DEVICE FOR ELECTRIC CIRCUITS.

SPECIFICATION forming part of Letters Patent No. 424,665, dated April 1, 1890.

Application filed January 22, 1890. Serial No. 337,733. (No model.)

*To all whom it may concern:*

Be it known that I, CHARLES G. YOUNG, a citizen of the United States, and a resident of New York, county and State of New York, have invented certain new and useful Improvements in System of Electrical Distribution, (Case 2,) of which the following is a specification.

My invention relates to a system of electrical distribution for electric lighting and power provided with means for interrupting both the outgoing and the incoming main or external lines with respect to their electrical connection to the electrical generator or to the field-magnet thereof of the system automatically under predetermined conditions.

The object of the invention is to cause the whole main line to exist free from danger on the instant that the same becomes practically useless for electric lighting or power. For instance, if the main line becomes ruptured at any given point or points in a series system of electric lighting or electric power the lights are extinguished and the motors stopped; or if for any reason the current becomes abnormally strong to an unusual extent the lamps and motors may be injured; or if the main line comes in contact with a ground-connection—as, for instance, through touching a telephone-wire—injury is likely to happen sooner or later to persons or animals coming in contact with the main line under certain conditions. Whether the main line breaks, whether the current becomes injuriously abnormal, or whether the main line becomes grounded my invention provides that the whole main line outside of the central station where the generator is located shall be out of electrical contact with the generator, or shall be put into such a condition that it will be impossible for a current to pass from the generator to any part of the main line outside of said central station.

My invention is illustrated by the accompanying drawings, in which Figure 1 is a view, partly in diagram, of a complete system in so far as my invention is concerned. Fig. 2 is a similar view of a modification.

The system consists of the combination of an electric generator $a$, provided with terminals $b$ and $b'$, which are carried by a pivoted armature $c$, and which are in contact normally and respectively with fixed terminals $e$ and $e'$, a main line having an outgoing line $f$ and an incoming line $f'$, the former being connected to the terminal $e$ and including a magnet-coil $g$, wound upon the core $h$, and the latter $f'$ being connected to the terminal $e'$. It is evident that $f'$ may be the outgoing and $f$ the incoming line; but for convenience they will be called as first stated. If the main line should become broken—for instance, at the point $i$, indicated by a dotted line—the pivoted lever $c$ or armature, which is represented as attracted to and in contact with the core $h$, will fall downward from said core, so that both terminals $b$ and $b'$ will be electrically interrupted, respectively, from the line $f$ and line $f'$ practically instantaneously, so that whether the main line becomes subsequently grounded, or whether a person or other animal comes subsequently in contact with it directly or through a second or third wire, (which may have come in contact with said main line before or after the rupture at the point $i$,) it will be impossible for any injury to be done by the generator $a$ directly or indirectly. If only the wire $f$ and not the wire $f'$, or vice versa, were disconnected from the generator, the main line would by no means be in a safe condition, nor could it be called properly a "dead-wire." Suppose, for instance, the terminal $b$ should be accidentally connected to ground by closing the switch $j$ and the line $f'$ should break at $i'$, then it is evident that if the line $f'$ should come in contact with a man $m$, who is also in contact with wet ground $n$, he will receive a current which will injure or kill him if of sufficient intensity and quantity. Accidents of this kind have happened where a cut-out has been provided for only one branch of the main line. In my case, when I have a system as described in Fig. 1, it becomes impossible for such an accident to occur, because both of the lines $f$ and $f'$ will become disconnected from the electrical generator $a$. The core $h$ may be provided also with two fine-wire coils $g'$ and $g''$, which are in circuit, respectively, with one terminal $e$ and condenser $o$ and one terminal $e'$ and condenser $o'$, and both connected to ground. If the main line should become grounded through touching a telephone-wire or by closing the switch $j'$, then will the pivoted armature $c'$ at the opposite end of the core $h$ close the circuit $f''$, whose terminals are the terminals of the coil $g$. The coil $g$ being thereby short-circuited, the core $h$ will be so much weakened that the armature $c$ will drop and break the lines $f$ and $f'$ at the terminals $e$ and $e'$. This operation is apparent from the fact that the terminal $p$, connected to the circuit $f''$, is so located as to come in contact with the pivoted armature $c'$, whose pivot $p'$ is in circuit with the circuit $f''$. A retractile spring $q$ is of such strength as to maintain the terminal $p$ out of contact with the armature $c'$ when no current is passing through one or both of the coils $g'$ and $g''$. The spring $q$ is of such strength that when an abnormal current of greater strength than the normal current passes through the coil $g$, or when a current passes through one or both of the coils $g'$ or $g''$, the armature $c'$ will be attracted in such a manner as to short-circuit the coil $g$. When the coil $g$ is short-circuited, the armature $c$ drops, and the generator becomes electrically disconnected from the main line. The stationary spring $u$ retains the contact $u'$ in electric contact with the post or terminal $p$.

The pivoted armature $c'$ has an arm $r$, provided with a hook $s$, which becomes useful for holding up the armature $c'$ against the core $h$ until the latter becomes magnetized sufficiently to hold up said armature by itself.

The above description relates particularly to Fig. 1 and only in part to Fig. 2. In the latter the terminals $b$ and $b'$ are electrically connected to the terminals $e''$ and $b'''$ of the field-magnet $t$ of the generator $a$, instead of to the terminals of the brushes $b''$ and $b'''$, as in Fig. 1. When the terminals $e$ and $b$ and $e'$ and $b'$ are out of contact, the circuit of the field-magnet $t$ is broken, so that the generator becomes inoperative, and therefore no injury can be done to any person or animal coming in contact with the main line after a rupture has been made at the point $i$ or after the current in the main line has become so abnormally strong as to close the short circuit $f'''$.

My invention is particularly useful for overhead conductor systems where death and fire are likely to occur when the electrical generator has an electrical connection with the main line, although the same may be broken or grounded or carrying an excessive current.

The purpose of my invention is also accomplished, as set forth above, by automatically rendering the generator inoperative by electrically opening or breaking the terminals of the field-magnet at $e''$ and $e'''$ while the main line is still in circuit with the generator.

I claim as my invention—

1. In a system of electrical distribution, the combination of an electric generator, a main line in circuit therewith, electric contact-terminals normally in closed circuit with and between the poles of said generator and said main line, and automatic means for electrically separating said terminals upon rupture of the main line.

2. In a system of electrical distribution, the combination of an electric generator, a main line in circuit therewith, a magnet-core provided with three coils, one of which is in circuit with said main line, the second in circuit with the ground and one pole of the generator, and the third in circuit with the ground and the opposite pole of the generator, means—such as, for instance, a circuit-closer $j'$—for making electrical connection between said main line and the ground, a circuit-breaking armature maintaining the main line in circuit with said generator while attracted by said magnet, the second armature pivoted and balanced for the purpose set forth and included in a circuit for short-circuiting the said first coil when said second armature is attracted to said core.

3. In a system of electrical distribution, the combination of an electric generator, a main line in circuit therewith, and including an electro-magnet at or near said generator and a circuit-breaking armature belonging to and attracted by said magnet, and means—such as a second armature provided with a circuit-closer—for short-circuiting said magnet under an abnormally-excessive current in the main line, whereby the first armature is no longer attracted and automatically opens said main line.

4. In a system of electrical distribution, the combination of a main line, an electric generator and translating devices in circuit therewith, a circuit-breaking armature also in circuit therewith at or near said generator attracted to conducting control by an electro-magnet normally energized by the electric charge upon the main line, a circuit-closing armature in a normally-open short-circuiting line for short-circuiting said magnet and so balanced as to maintain the short-circuiting line open during a normal current in said main line and to close said short-circuiting line when an abnormal and excessive current traverses said main line, whereby the said first armature is no longer attracted by said magnet and opens said main line.

5. In a system of electrical distribution, the combination of an electric generator, a main line in circuit therewith, armature circuit-breakers between the poles of said generator and said main line, and electro magnet or magnets within inductive relation to said armature circuit-breakers for operating said circuit-breakers under abnormal conditions of the current in the main line.

6. In a system of electrical distribution, the combination of an electrical generator, a main line in circuit therewith, a circuit-breaking armature in circuit with the field-magnet of the generator, and automatic means for opening said circuit-breaker upon rupture of the main line.

7. In a system of electrical distribution, the combination of an electric generator, a main line in circuit therewith, a circuit-breaking armature in circuit with the field-magnet of the generator, a magnet in circuit with said main line retaining said armature in such a manner that the main line is closed, and means—such as a second armature for said magnet—for short-circuiting said magnet under abnormal conditions of the current in the main line, whereby the circuit-breaker destroys the electrical connection between the generator and the main line when the said magnet becomes short-circuited.

8. In a system of electrical distribution, the combination of an electrical generator, terminals thereof, a main line, terminals thereof in contact with the first-named terminals, all the terminals being located at or near said generator, an electro-magnet included in the said main line, an armature therefor carrying one pair of said terminals and normally held attracted to said magnet, two other magnets in circuit, respectively, with the ground and opposite terminals of said generator, a second armature for said last-named magnets provided with means—such as an automatic circuit-closer spring—for short-circuiting said first magnet when the other magnets become energized.

9. In a system of electrical distribution, the combination of an electrical generator, a main line in circuit therewith and having outgoing and incoming lines, an electro-magnet in circuit with said main line, a circuit-breaking armature within inductive relation to said magnet, and terminal contacts at or near and connected electrically to the respective terminals of said generator or of its field-magnet and to the terminals of said circuit-breaking armature, for the purpose, as hereinbefore described, of electrically destroying the electric generation or charge upon each and both of the outgoing and incoming lines.

10. In a system of electrical distribution, the combination of an electric generator, a main line in circuit therewith, armature circuit-breakers between the poles of said generator and said main line, and an electro magnet or magnets within inductive relation to said armature circuit-breakers for operating said circuit-breakers under abnormal conditions of the current in the main line in which said magnet or magnets are included.

11. In a system of electrical distribution, the combination of an electric generator, a main line in circuit therewith, electric contact terminals, normally inclosed circuit with and between the poles of said generator and said main line, and automatic means—such, for example, as an electro magnet or magnets in the main line—for electrically separating said terminals upon rupture of the main line.

12. The method of operating a system of electrical distribution embodying an electric generator in circuit with a main line, consisting in automatically electrically separating the poles of the generator from the main line when the latter becomes ruptured.

In testimony that I claim the foregoing as my invention I have signed my name, in presence of two witnesses, this 13th day of January, 1890.

CHARLES G. YOUNG.

Witnesses:
EDWARD P. THOMPSON,
E. G. DUVALL.